United States Patent [19]

Davis

[11] 4,067,348

[45] Jan. 10, 1978

[54] FUEL SHUT-OFF VALVE

[75] Inventor: Bill G. Davis, Phoenix, Ariz.

[73] Assignee: Jetco, Inc., Phoenix, Ariz.

[21] Appl. No.: 680,576

[22] Filed: Apr. 26, 1976

Related U.S. Application Data

[63] Continuation-in-part of Ser. No. 544,802, Jan. 28, 1975, abandoned.

[51] Int. Cl.$^2$ .............................................. F16K 31/12

[52] U.S. Cl. .............................. 137/87; 123/198 DB; 251/63

[58] Field of Search .................. 123/198 DB; 137/87, 137/94, 456, 461; 251/63, 63.5

[56] References Cited

U.S. PATENT DOCUMENTS

| | | | |
|---|---|---|---|
| 843,391 | 5/1907 | Ferris | 251/63.5 X |
| 1,339,798 | 5/1920 | Thompson | 123/198 DB |
| 2,617,640 | 11/1952 | Hieger | 137/87 X |
| 3,182,950 | 5/1965 | Stone | 251/63 |
| 3,523,521 | 8/1970 | Goodwin | 123/198 DB |

FOREIGN PATENT DOCUMENTS

| | | | |
|---|---|---|---|
| 337,341 | 3/1936 | Italy | 251/63.5 |
| 445,704 | 4/1936 | United Kingdom | 251/63 |
| 197,007 | 5/1923 | United Kingdom | 251/63.5 |

*Primary Examiner*—Robert G. Nilson

*Attorney, Agent, or Firm*—Cahill, Sutton & Thomas

[57] ABSTRACT

A fuel shut-off valve is described having a body with a cylindrical bore divided into first and second sections by an annular tapered shoulder. A piston is slidably positioned in the bore and inlcudes an O-ring that seats against the tapered shoulder or seat to isolate the first and second sections of the bore. One end of the piston is provided with a second O-ring sealingly engaging the bore and isolating that portion of the bore on one side of the face of the piston from the remainder of the bore. A fuel inlet passage communicates with the first bore section and an oil inlet passage communicates with a second bore section. An outlet passage communicates with the first bore section at a position axially displaced from and disposed on the opposite of the tapered seat from the first inlet passage. A mechanical override button forming a second piston extends through a second bore coaxial with the first bore and engages the face of the piston to permit manual movement of the piston against the force of a biasing spring. The valve is modifiable by means of a bypass line to allow a predetermined amount of fuel to flow between the fuel inlet and fuel outlet passages even when the oil pressure is below the minimum level in order to maintain operation of power equipment on the vehicle and allow emergency movement of the vehicle.

14 Claims, 3 Drawing Figures

FUEL SHUT-OFF VALVE

This application is a continuation-in-part of my co-pending U.S. application, Ser. No. 544,802, filed on Jan. 28, 1975 and entitled "Fuel Shut-Off Valve" now abandoned.

The present invention pertains to valves and, more particularly, to valves for receiving a first fluid and permitting or preventing the passage of the first fluid in response to the pressure of a second fluid. The valve may also be modified by the provision of a bypass line which permits a predetermined amount of fuel to pass to the engine to maintain operation of power equipment such as brakes, steering and the like and also permit the engine to operate at a lever which will enable movement of the vehicle if desired, such as in emergency situations.

In the operation of internal combustion engines it is frequently desirable to provide a means for automatically stopping the engine when the oil pressure falls to a dangerously low level. To provide such protection, it is possible to provide an oil pressure sensor which can be used to detect the low oil pressure and to provide a suitable control signal to shut the engine off. Such systems have tended to become complex and in many instances not particularly reliable; further, it is desirable to render such systems tamper-proof to prevent the operator from overriding the effects of the system to the detriment of the engine. Such shut-down systems are particularly desirable in such environments as large truck engines where the effects of low oil pressure can be particularly hazardous. It may also be desirable to provide a valve which allow limited power operation, rather than a complete shut-down.

It is therefore an object of the present invention to provide a means of detecting low oil pressure and causing the shut-down of an internal combustion engine.

It is also another object of the present invention to provide a means for detecting low oil pressure in an internal combustion engine and for shutting off the fuel supplied to the engine in response thereto.

It is still another object of the present invention to provide a means for shutting off the fuel to an internal combustion engine when the oil pressure fails to maintain an acceptable level and wherein the effects of the shut-off system may be overridden on a limited basis to permit starting or restarting of the engine.

A still further object is to provide a means for reducing the fuel flow to such an engine when the oil pressure fails to maintain an acceptable level such that only limited non-deleterious power operation is possible.

These and other advantages of the present invention will become more apparent to those skilled in the art as the description thereof proceeds.

The present invention may more readily be described by reference to the accompanying drawings in which.

Figure 1:
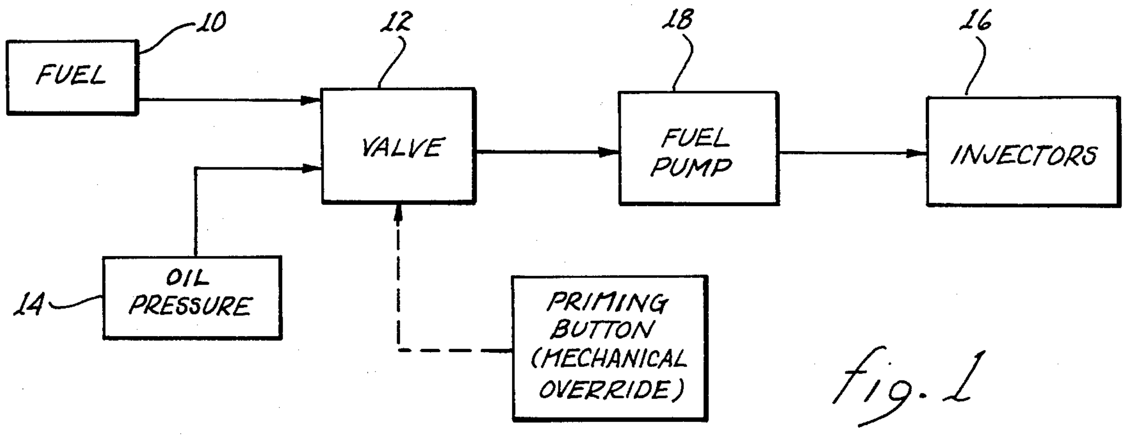
FIG. 1 is a functional block diagram of an engine shut-down system incorporating the valve of the present invention.

Referring now to FIG. 1, a fuel tank 10 is connected to the shut-off valve 12 having a second input shown schematically in FIG. 1 as an oil pressure source 14.

Fuel passing through valve 12 is supplied to injectors 16 by a fuel pump 18. The injectors 16 may be conventional injectors normally found in diesel engines of the type used in the trucking industry.

A priming button 20 forms a mechanical override and is indicated in FIG. 1 as a mechanical input to the valve 12. Fuel is drawn by the fuel pump 18 from the source 10 and is supplied to the injectors 16 through the valve 12; while the oil pressure applied to the valve 12 is above a predetermined minimum value, the fuel flow is uninterrupted. When the oil pressure drops below the minimum value, the valve 12 closes and shuts the full supply 10 off. It may be noted that the valve 12 is positioned on the lower pressure side of the fuel pump 18 to minimize the effects of fuel pressure fluctuations on the valve 12.

When the engine is stopped, the oil pressure is, of course, below the minimum acceptable level; therefore, to permit starting the engine, the shut-off valve 12 must be rendered temporarily ineffective to permit the initial flow of fuel therethrough. This override function is provided by the priming button 20 as will be more clearly described in connection with FIG. 2.

Figure 2:
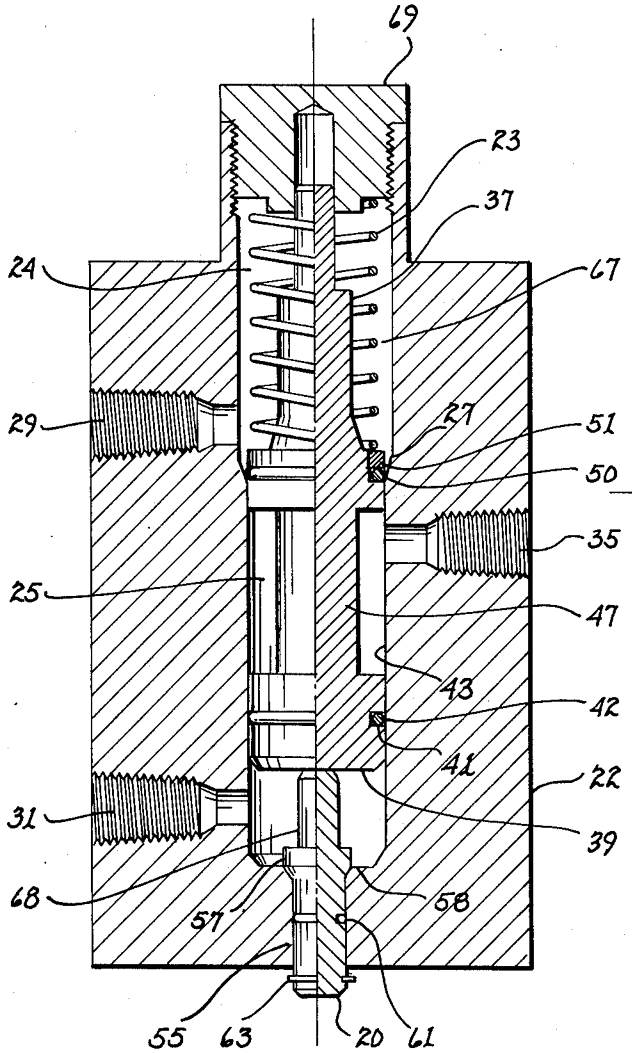
FIG. 2 is a sectional view of a valve constructed in accordance with the teachings of the present invention.

Referring now to FIG. 2, valve 12 is shown in detail in section. The valve includes a valve body 22 having a cylindrical bore 23 therein. The bore is divided into a first section 24 and a second section 25 by a radially inwardly extending, tapered, annular seat 27. A first inlet passage 29 extends through the body 22 and communicates with the first bore section 24; the inlet passage 29 is intended to be connected to fuel source or tank. A second inlet passage 31 extends through the body 22 and communicates with the second bore section 25; the inlet passage 31 is connected to an oil pressure line that in turn may be tapped into the engine oil system at any convenient location.

An outlet passage 35 extends through the body 22 and communicates with the second bore section 25. A piston 37 is slidably mounted within the bore 23 and includes a piston face 39 positioned to receive the pressure exerted thereon by the oil admitted to the bore through inlet 31. An annular groove 41 is formed in the piston 37; an O-ring 42 is mounted in the groove 41 and slidingly and sealingly engages the surface 43 of the second bore portion 25.

The piston 37 includes a reduced diameter portion 47 for purposes to be described later. A second O-ring 50 is mounted on the piston 37 and is maintained in place by a retaining ring 51; the O-ring 50 is positioned to engage the annular seat 27 when the piston 37 is in the position shown to thereby isolate bore section 24 from bore section 25. Opposing ring 51 is a shoulder 52 of piston 37. When the piston 37 is moved upwardly (with respect to FIG. 2), the O-ring 50 disengages the annular seat 27 and permits fuel to flow from inlet passage 29, through bore section 24, past annular seat 27, into bore section 25, along and around the reduced diameter portion 47 and thence outward through the outlet passage 35.

A mechanical override or priming button 20 is formed into a second piston slidably mounted in a second bore 55 coaxially aligned with the bore 23. The priming button 20 is provided with an increased diameter portion 57 forming an annular shoulder 58 that abuts the end of the bore 55 where it joins the bore 23.

The button 20 extends inwardly of the bore 23 into an abutting relationship with the face 39 of the piston 37; the button 20 is also provided with an annular groove 60 having an O-ring 61 therein to prevent the escape of oil past the button to the exterior of the body 22. It will be obvious that inward motion of the button 20 will result in lifting of the piston 37; to limit the inward motion of the button 20, a retaining clip 63 is mounted on the button in an annular groove provided therefor on the external portion of the button 20. A biasing spring 67 is compressed between the retaining ring 51 and bore plug and piston guide 69.

The operation of the valve may be described as follows. Under engine off conditions (with the valve as shown in FIG. 2), the fuels supply is connected to the inlet passage 29. An oil line connected to a suitable oil pressure point in the engine is connected to inlet passage 31. Since the engine is off, oil pressure is zero and the biasing spring 67 will maintain the piston 37 in the position shown with the end 68 of the button 20 acting as a stop. To permit the engine to be started, the operator pushes the button 20 until the retaining ring 63 engages the body 22, thus lifting the piston 37 and slidingly disengaging the O-ring 50 from the annular seat 27. A slight amount of fuel, sufficient for starting and idling only, is therefore permitted to pass from the passageway 29 to the outlet passage 35. It may be noted at this point that the fuel permitted to pass through the valve is very limited so that the engine cannot be damaged by over-revving or racing before a suitable oil pressure is established.

When the engine starts, oil pressure rises and the pressure exerted through the inlet passage 31 to the face 39 of the piston 37 results in a force on the piston sufficient to force it upwardly and overcome the downward force exerted by the biasing spring 67. Simultaneously force is exerted on the button 20 forcing it downwardly against the force exerted thereon by the operator until the shoulder 58 abuts the body 22.

With the engine oil pressure above the predetermined minimum value, the piston 37 is forced upwardly and maintained in this upward position to position the reduced diameter portion 47 of the piston 37 opposite the inlet passage 29 and the outlet passage 35, thereby imposing minimum fuel flow restriction and enabling the engine to be operated normally. The O-ring 42 acts as an annular sealing means to prevent the oil acting on the face 39 from entering the outlet 35. If the oil pressure should drop below the predetermined minimum value, the biasing spring 67 will overcome the force exerted on the face 39 by the oil and will force the O-ring 50 into sealing engagement with the annular seat 27, thereby shutting off the fuel supplied to the engine.

Since the valve is positioned on the low pressure side of the fuel pump, there is usually sufficient fuel contained in the fuel lines between the valve and the fuel pump to permit the engine to be operated for a brief period of time after actuation of the valve (sufficient to permit the vehicle to be driven to the side of the road to a safe position).

If the operator attempts to overcome the limiting effect of the retaining ring 63 on the button 20 by removing the retaining ring, it may be seen that forcing the button into the body 22 will result in the O-ring 61 being forced upwardly to a point where it is no longer in contact with the bore 55; oil will then be permitted to exit through the bore 55, around the button 20 and to the exterior of the body 22, thus warning the operator of the improper procedure he is following.

Figure 3:
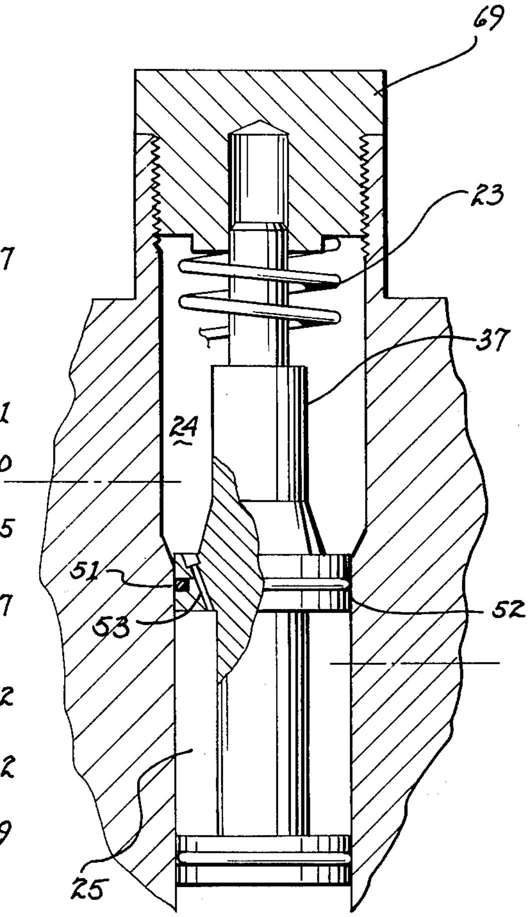
FIG. 3 is a sectional view of a portion of an embodiment of a valve of the present invention illustrating a bypass line.

In FIG. 3, an optional but preferred bypass line 53 is provided which extends through ring 51 and shoulder

52. Bypass line 53 provides communication between bore sections 24 and 25 even when piston 37 is in the seated position as shown in FIG. 2. Thus, in the event the oil pressure drops below a predetermined minimum level, bypass line 53 allows sufficient fuel to pass through valve 12 to sustain engine idle level such that emergency movement of the vehicle may still be accomplished. Also, this permits continued operation of those systems which depend upon continued engine operation such as the braking and steering systems. In one embodiment, a bypass line 53 having a diameter of 0.018 in. (0.045 in.) has proved suitable, allowing the engine to idle at approximately 1000 rpm.

What is claimed is:

1. A valve comprising a. a body having a cylindrical bore;

b. a radially inwardly extending annular seat dividing said bore into first and second sections;

c. a first inlet passage communicating with said first bore section for connection to a fuel tank;

d. a second inlet passage communicating with said second bore section for connection to a source of oil having a predetermined normal operating pressure;

e. an outlet passage communicating with said second bore section for connection to a fuel pump for transmitting fuel from said valve to said pump;

f. a first piston slidably positioned in said cylindrical bore, said piston including 1. a pressure receiving face positioned between said second inlet and said outlet for subjection to the pressure of said oil;
2. a fuel face positioned within said first bore section for subjection to the pressure of said fuel; and
3. a reduced diameter portion positioned between said fuel face and said pressure-receiving face to permit fuel to flow through said second bore section;

g. a first annular sealing means positioned in said second bore section between said pressure-receiving face and said outlet to prevent oil from passing said face to said outlet;

h. a second annular sealing means positioned in said first bore section and movable in said bore with said piston to a position engaging said annular seat to prevent passage of fuel from said first bore section to said second bore section;

i. a biasing spring mounted in said bore urging said piston to a sealed position wherein said second annular sealing means engages said annular seat, said biasing spring exerting a force on said piston in a direction opposite to, but less than, the force exerted on said piston by said normal operating pressure;

j. passage means providing communication between said first bore section and said second bore section for permitting a predetermined quantity of fuel to pass through said valve when said second annular sealing means is in said position engaging said annular seat.

2. The combination set forth in claim 1 further comprising a mechanical override means extending through said body and contacting said first piston for urging said first piston against the force of said biasing spring to disengage said second annular sealing means from said annular seat to permit fuel to flow from said first inlet passage to said outlet passage.

3. The combination set forth in claim 2, wherein said mechanical override means comprises a second bore in said body and a second piston slidably positioned in said second bore, said second piston having an annular groove with an O-ring therein sealingly engaging said second bore.

4. The combination set forth in claim 3, including stop means limiting the travel of said second piston to limit the distance said second annular sealing means may be moved from said annular seat.

5. The combination set forth in claim 4, wherein said stop means for limiting the travel of said second piston comprises a removeable retaining ring partially encircling said second piston, externally of said body.

6. The combination set forth in claim 5, wherein removal of said retaining ring permits said second piston to travel beyond the limit to a position interrupting the sealing engagemment between said second bore and the O-ring in the annular groove of said second piston thereby permitting oil to exit said body via said second bore.

7. The combination set forth in claim 3, wherein said second piston contacts said pressure-receiving face to form a stop to position said piston, said biasing spring urging said piston against said second piston.

8. The combination set forth in claim 1, wherein said first annular sealing means is an annular groove in said piston having an O-ring therein, slidably engaging said bore.

9. The combination set forth in claim 1, wherein said second annular sealing means comprises an annular groove in said piston having an O-ring therein for engaging said annular seat.

10. The combination set forth in claim 1, wherein said annular seat is radially, inwardly tapered.

11. The combination set forth in claim 10, wherein said first annular sealing means is an annular groove in said piston having an O-ring therein, slidably engaging said bore.

12. The combination set forth in claim 10, wherein said second annular sealing means comprises an annular groove in said piston having an O-ring therein for engaging said annular seat.

13. A valve comprising:

a. a body having a cylindrical bore;

b. a radially inwardly extending annular seat dividing said bore into first and second sections;

c. a first inlet passage communicating with said first bore section for connection to a fuel tank;

d. a second inlet passage communicating with said second bore section for connection to a source of oil having a predetermined normal operating pressure;

e. an outlet passage communicating with said second bore section for connection to a fuel pump for transmitting fuel from said valve to said pump;

f. a first piston slidably positioned in said cylindrical bore, said piston including 1. a pressure-receiving face positioned between said second inlet and said outlet for subjection to the pressure of said oil;
2. a fuel face positioned within said first bore section for subjection to the pressure of said fuel; and
3. a reduced diameter portion positioned between said fuel face and said pressure-receiving face to permit fuel to flow through said second bore section;

g. a first annular sealing means positioned in said second bore section between said pressure-receiving face and said outlet to prevent oil from passing said face to said outlet;

h. a second annular sealing means positioned in said first bore section and movable in said bore with said piston to a position engaging said annular seat to prevent passage of fuel from said first bore section to said second bore section;

i. a biasing spring mounted in said bore urging said piston to a sealed position wherein said second annular sealing means engages said annular seat, said biasing spring exerting a force on said piston in a direction opposite to, but less than, the force exerted on said piston by said normal operating pressure;

j. mechanical override means extending through said body and contacting said first piston for urging said first piston against the force of said biasing spring to disengage said second annular sealing means from said annular seat to permit fuel to flow from said first inlet passage to said outlet passage comprising 1. a second bore in said body
2. a second piston slidably positioned in said second bore, said second piston having an annular groove with an O-ring therein sealingly engaging said second bore; and k. retaining means for limiting the travel of said second piston to limit the distance said second annular sealing means may be moved from said annular seat, whereby removal of said retaining wears permits said second piston to travel beyond the limit to a position interrupting the sealing engagement between said second bore and the O-ring in the annular groove of said second piston, thereby permitting oil to exit said body via said second bore.

14. The combination set forth in claim 13 wherein said retaining means includes a removable retaining ring partially encircling said piston externally of said body.

* * * * *